United States Patent [19]

Kamimura

[11] 4,348,083
[45] Sep. 7, 1982

[54] CRIME PREVENTIVE DOOR VIEWER

[76] Inventor: Yasushi Kamimura, 3-3, Chuou 2-chome, Outa-ku, Tokyo, Japan

[21] Appl. No.: 136,303

[22] Filed: Apr. 1, 1980

[30] Foreign Application Priority Data

Apr. 5, 1979 [JP] Japan .................................. 54-43957

[51] Int. Cl.³ .............................................. G02B 25/04
[52] U.S. Cl. ......................................... 350/453; 350/69
[58] Field of Search ............................ 350/69, 453, 474

[56] References Cited

U.S. PATENT DOCUMENTS 4,116,529  9/1978  Yamaguchi ............................ 350/69
4,172,636  10/1979  Yanagimachi ....................... 350/453
4,175,824  11/1979  Daley .................................... 350/69

Primary Examiner—John K. Corbin
Assistant Examiner—Rebecca D. Gass
Attorney, Agent, or Firm—Toren, McGeady & Stanger

[57] ABSTRACT

A crime preventive optical door viewer having an assembled optical system with a field of vision of about 160 degrees is set through a door to enable viewing of the outerside from the inside of the door. The optical system includes first and second objectives having the same shape but arranged with a curvature on opposite surfaces, an eyepiece, a focus length keeper or focus length cylindrical sleeve which is put between the second objective and the eyepiece, and a colored filter placed at an appropriate location. The lenses are arranged on the optical axis and are assembled in parallel into an inner tube from one end thereof, then the inner tube is screwed and set into an outer tube.

7 Claims, 5 Drawing Figures

CRIME PREVENTIVE DOOR VIEWER

BACKGROUND OF THE INVENTION

This invention relates to an improvement in a crime preventive optical door viewer which may be set through a door or the like, whereby an observer may, from inside of the door, view a person or object on the outside of the door within the field of vision.

Conventionally, a house, a hotel or an office, may be equipped with a door viewer to enable surveillance of visitors or the like and to operate for prevention against crime. However, because of structural requirements, very complex steps may be involved in manufacturing and assembly of such door viewers. In this regard, it is well known that a conventional door viewer is comprised of two objectives and one eyepiece, and that the conventional construction utilizing an outer tube extending through the wall of the door is set by means of a threaded inner sleeve, a threaded tube and a "C" shaped spring without binding agents. Furthermore, other fixing means for both members of the conventional door viewer for attaching of both flanges of the inner and outer tubes provides a male screw on the outer surface of the inner tube and a female screw on the inner surface of the outer tube. Thus, both flanges are exposed from the surface of the door, and both tubes are threaded on the above stated screw.

U.S. Pat. No. 4,082,434 to Hayashi et al discloses a wide-angle optical system for a door viewer which includes an inner sleeve illustrated in FIG. 1 of that patent wherein the optical system of the two objective lenses and one eyepiece is assembled with each inner and outer tube and the inner sleeve. The concave objective lens 11 has a front convex surface 14 and a rear concave surface 15, and the intermediate concave lens 12 has a front concave surface 16 and a rear flat surface. It is generally recognized that the inner sleeve or the lens tube 118 operates only as a stopper of the second objective lens as indicated from an embodiment illustrated in FIG. 7, since a convex lens 113 is appropriately positioned in the inner sleeve 118 or the like to coincide with both focal points $F_1$ and $F_2$.

U.S. Pat. No. 4,116,529 discloses a wide-angle spyglass comprising three lenses, a threaded inner sleeve and a threaded cylindrical member and a C-shaped spring for a stopper of an eyepiece. The wide-angle lens 15 has a front convex surface 16 and a rear concave surface 17, and the objective 18 has a front concave surface and a rear flat surface. The threaded inner sleeve operates concurrently as the lenses stopper and an inner tube for connection in an outer sleeve, since an objective is firstly fitted in the barrel member before the inner sleeve and its fixture member is mounted to the barrel member.

Japanese Utility Model Publication No. 22057/1971 discloses a wide-angle door scope which includes an embodiment illustrated in FIG. 2 of that Utility Model Application wherein four lenses are assembled in the inner sleeve. The first dispersing lens 10 has a front convex surface 14 and a rear concave surface 15, the second concave lens 11 has a front flat surface 17 and a rear concave surface 19, and the third concave lens 12 has a front concave surface 21 and a rear flat surface 22 respectively. Also an eyepiece is resiliently fixed on the inner peripheral surface of the inner sleeve. It is generally recognized that the inner sleeve operates as the lens stopper and a fixing member thereof in an outer sleeve.

SUMMARY OF THE INVENTION

The door viewer of the present invention comprises substantially one optical assembly consisting of first and second objectives, an eyepiece having the same diameter as said first and second objectives, inner and outer tubes, a focus length keeper cylindrical sleeve which has a length determined by the focal length of the lenses, and a threaded stopper ring which covers the first objective. Furthermore, the door viewer of the present invention is able to have attached a colored filter to create a Haze-Cut Effect by extinction of short wave length rays of sunlight or the like.

Accordingly, a principal object of the present invention is to provide a door viewer enabling outside vision within an angular range of about 160 degrees by a smaller sized door viewer comprising a two objectives and one eyepiece optical system.

Another object of the present invention is to provide a door viewer comprising only two similarly shaped concave lens which are used in common as the first and the second objectives, a convex lens for the eyepiece, and cylindrical members operating as a supporter or maintainer to easily set the lenses assembly therewith without requiring binding materials or agents.

A further object of the present invention is to provide a door viewer having a focus length keeper or a focus length cylindrical sleeve which is placed between the eyepiece and the second objective for absorption of diffused refraction within the cylindrical sleeve and for maintaining the lenses therein, and for further concurrent operation as the focus length keeper and as a stopper of the lenses.

A still further object of the present invention is to provide a simple door viewer comprising three lenses consisting of two objectives and one eyepiece with a focus length keeper cylindrical sleeve, both inner and outer tubes, and a threaded ring of a frame, whereby manufacturing costs may be lowered and unnecessary members and steps for construction thereof can be.

A further object is to provide a door viewer having a colored filter which is positioned at a proper place thereof to create a Haze-Cut Effect by extinction of short wave length rays from sunlight or the like.

Other objectives and many of the attendant advantages of this invention will be readily appreciated as the same become better understood by reference to the following description taken in connection with the accompanying drawings.

BRIEF DESCRIPTION OF THE DRAWINGS

The accompanying drawings illustrate the preferred embodiments of the present invention. In the drawings, the same reference numerals illustrate the same parts of the invention, in which.

THE DETAILED DESCRIPTION OF THE INVENTION

Figure 1:
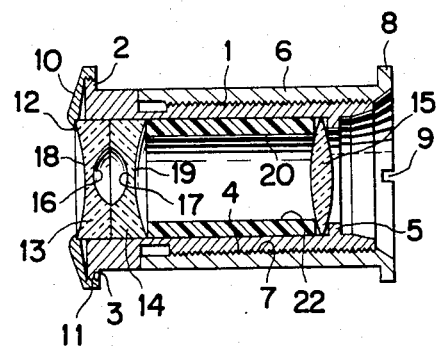
FIG. 1 is a cross sectional view of the door viewer of the invention.
Figure 2:
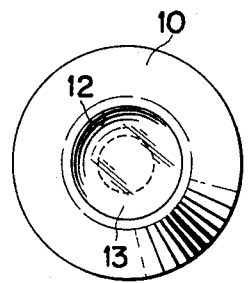
FIG. 2 is a front view of the door viewer.
Figure 3:
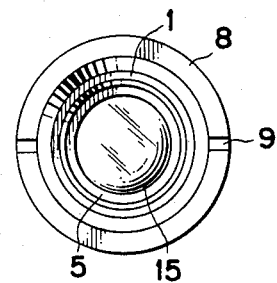
FIG. 3 is a rear view of the door viewer.

Referring now to the drawings, an inner tube of a lens support means 1 comprises a cylindrical member and a flange 2 at one end of the cylindrical member and male screw threads 3 and 4 formed on both the outer peripheral surface of the flange and on the cylindrical member. The male screw thread 4 is provided over about two-thirds of the length from the right end to the left of the inner tube, and an annular flange 5 is formed at the near portion from the right end on the inner surface of the tube 1.

An outer cylindrical tube 6 also has a female screw thread 7 on an inner peripheral surface for engagement with male screw thread 4 of the inner tube 1. The outer tube is used as a stopper means for the inner tube. Another flange 8 is provided at an end of the tube 6 on which at least one notch 9 is provided for rotation of the tube 6 to be engaged with the inner tube 1 by rotatable means (not shown).

A stopper ring 10 comprises a tapered annular flange having a peripheral rim 12, and a cylindrical base having a female screw thread 11 on the peripheral inner surface for engagement with the male screw thread 3 provided on the surface of the flange 2 at the front portion of the inner tube 1.

Figure 4:
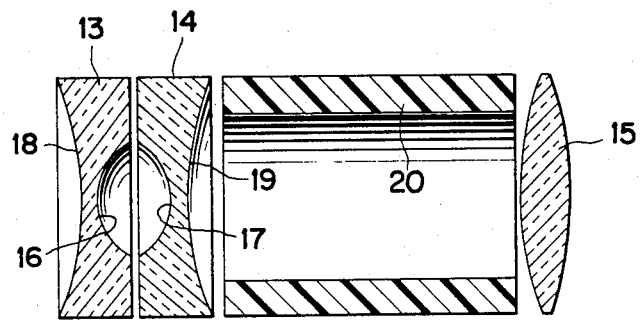
FIG. 4 is an exploded sectional view showing the arrangement of the lenses and the focus length keeper sleeve.
Figure 5:
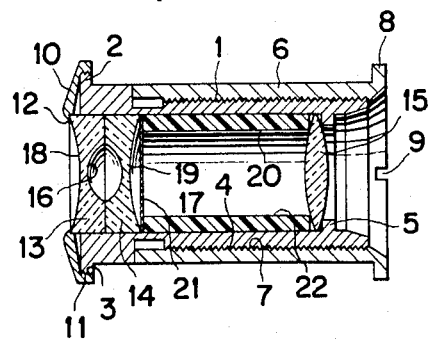
FIG. 5 shows another embodiment of the door viewer having a colored filter therein, and is a cross sectional view of the door viewer showing the basic structure and the colored filter.

With regard to the optical lenses system, a first objective 13, a second objective 14 and an eyepiece 15 having approximately same outer diameter are provided with the first and second objectives 13 and 14 being formed with surfaces having a different curvature on opposite sides thereof. The first objective 13 is formed with a concave surface 18 at the front surface having a larger curvature diameter, and with a concave surface at the rear thereof having a smaller curvature diameter. The second objective 14 is formed with a concave surface 17 at the front surface having a smaller curvature diameter which is the same as that of the rear surface 16 of the first objective as shown in FIG. 4. A concave surface 19 at the rear of the lens 14 has a larger curvature diameter which is the same as that of the front surface 18 of the first objective 13.

Consequently, the assembly consists of a pair of similarly shaped concave lenses which are symmetrically formed and arranged with the concave surfaces 18 and 19 having the larger diameters facing away from each other and with the concave surfaces 16 and 17 having the smaller diameters facing toward each other. Therefore, the lenses may be used interchangeably thereby reducing the production costs of the assembly.

Further an eyepiece 15 is provided with a convex surface on both sides thereof. Consequently, it is sufficient to provide only two differently shaped lenses for the present invention, that is, one shape is provided for both the objective lenses and another shape for the eyepiece. Use of a common shape for both the first and the second objectives substantially decreases of number differing parts necessary for the assembly and thus the cost for manufacturing is reduced.

A focus length keeper 20 or a focus length sleeve member is provided with an appropriate length considering the focus lengths of the lenses, and preferably it is made from synthetic resin or the like to softly contact with the lenses.

The first and the second objectives, and the eyepiece are set on the optic axis through the focus length keeper sleeve 20 and they constitute the assembly of the optical means. With regard to the assembly of the door viewer, firstly, the eyepiece 15 is inserted into the inner tube 1 so as to engage with the annular flange 5, and then the focus length keeper sleeve 20 is inserted into the tube 1 to contact with the eyepiece and to hold it with the annular flange 5. The second and the first objectives 14 and 13 are then set on the end of the focus length keeper sleeve 20 on the optic axis. The first and second objectives 13 and 14 are symmetrically formed and arranged with the smaller diameter concave surfaces 16 and 17 facing each other as shown in FIG. 4.

The first objective 13 is placed in the end of the inner tube 1 so as to project from the end of the inner tube 1 as shown in FIG. 1, and then the stopper ring 10 is put on the flange 2 and is screwed to engage the female screw thread 11 with the male screw 3 provided on the outer peripheral surface of the flange 2 of the tube 1. The peripheral edge portion of the first objective 13 is engaged with the peripheral inner rim 12 of the stopper ring 10. Accordingly, all lenses of the optical system are arranged in the inner tube 1, since the peripheral rim 12 of the stopper 10 engages with and presses down the protuberant edge portion of the first objective 13.

With regard to the focal length and visual angle, the visual angle widens in proportion to shortening of the focus length of the objective. In the present invention, it is intended to shorten the focus length of the objective and to widen the visual angle of the outer field by virtue of the large curvature concaves 18 and 19 of the first and the second objectives 13 and 14 in addition to the small curvature concaves 16 and 17 thereof. Consequently, the visual angle of the door viewer becomes wider. This is one of the most important features of the present invention.

With regard to another embodiment of the present invention to create the Hazy-Cut Effect in the assembly of the door viewer to clear up the hazy phenomenon occurring in the atmosphere, the embodiment provides a colored filter between the optical lenses. Generally, the hazy phenomenon occurs through stream or other corpuscles by diffusion of purple, blue or other short-wave rays of sunlight, artificial daylight or the like, and is visible with nattier blue. Therefore, definition, vividness degree or transparency in sight is influenced and diminished by the hazy phenomenon. Since a yellow colored filter absorbs much of these purple, blue and other short-wave rays of sunlight, when using the colored filter, it is expected that the Hazy-Cut Effect absorbing such hazy nattier blue and clearing the sight with the colored filter will be provided.

Therefore, in a preferred embodiment of the present invention, a door viewer having such yellow or light blue colored filter 21 consisting of a thin plate of synthetic resins or other materials between the second objective 14 and the focus length keeper sleeve 20 is provided to obtain such transparency of the clear sight of the outer field through the door viewer by using of the Hazy-Cut Effect to absorb such short-wave rays of sunlight or the like.

Even if the haze phenomenon occurs by incidence of short-wave rays through said stream or other corpuscles and diffusion thereof, good transparent sight can be obtained through the colored filter 21 by which said short-wave rays are absorbed. In the above-stated embodiment, the filter 21 is placed between the second objective and the end of the focus length keeper sleeve 20, however, the location of the filter is not limited and the filter is able to be positioned between the first and second objectives 13 and 14 or at any place in the door viewer. Also the color of the filter is not limited to yellow or light blue, and any suitable and appropriate color to absorb such nattier blue and to clear the hazed light may be used for the filter. Further, the materials of the filter are not limited to the synthetic resins, and glass or any other kind of transparent or limpid colorable materials may be used as the filter of the present invention.

One of the principal features of the present invention is to provide wide-angle vision of the outer field of about 160 degrees by the three lens system comprising of two similarly shaped objectives and one eyepiece.

Realization of magnification of the degree of the field of vision to about 160 degrees as stated above may be achieved by shortening the focus length with preparation of said especially formed two objectives having the large curvature diameter concaves on one side and having the small curvature diameter concaves on another side respectively as shown in FIG. 4.

The other features of the present invention involves provision of a tight and secure connection with the two objectives and the eyepiece through the focus length keeper sleeve 20 in a parallel manner on the optic axis. In this case, since the focus length keeper sleeve 20 is formed to have the focus length of the lenses and is made from the synthetic resins which are less hard than glass or metal materials, the sleeve 20 does not damage the surface of the lens and may be formed as one body and be made by mass production. The present focus length keeper sleeve keeps the focus length of the lenses therein and concurrently operates as a stopper of the lenses in the inner tube 1. Such connecting of the sleeve 20 with these lenses is very advantageous in addition to providing an easy arrangement of the focus length, and processing on the inner peripheral surface 22 of the sleeve 20 by painting in a black color or other interrelated color with such black color for prevention from diffused reflection of light is also easy.

By a further feature of the present invention the construction of the tube member supporting the lens assembly may be set in a simple manner and the necessary elements are a few. Namely, as shown in FIG. 1, with regard to the arrangement, the lens assembly is supported and kept secure by only one inner tube 1 and the stopper ring 10 therein.

As stated above, in the process of assembly of the door viewer, the eyepiece 15 and the focus length keeper sleeve 20 are first inserted into the tube 1 from one end opening to lie one upon another on the inner flange 5 and, further, the second and the first objectives 14 and 13 are inserted in the tube 1 one upon another to contact the relatively large curvature diameter surface of the second objective 14 with the end of the focus length keeper sleeve 20. The first and the second objectives 13 and 14 are symmetrically faced, with both small curvature concave surfaces 16 and 17. In this condition, the protuberant peripheral edge portion of the first objective 13 extends appropriately from the opening of the tube 1.

Then, the stopper ring 10 is attached and the female screw 11 of the ring 10 is engaged with the male screw 3 of the flange 2 of the inner tube 1. Accordingly, the peripheral stopper rim 12 of the stopper ring 10 pushes and engages with the peripheral protuberant edge portion of the concave lens 13. Therefore all the lenses are easily assembled in the inner tube 1 with the stopper ring 10. The above stated inner tube 1 which includes the necessary lenses is inserted into a hole provided through the door or the like from the outside, and then the outer tube 6 is inserted in the hole from the inside and the male screw 4 of the inner tube 1 and female screw 7 of the outer tube 1 are engaged by means of the notch 9. At the place that both flanges 2 and 8 of the tubes contact on the surfaces of the door, the door viewer is securedly placed through the door.

The size of these necessary elements is not limited and the size and shape thereof may be changed and also considered in accordance with a suitable requirement of the subject. Any change and other embodiment or design with regard to the three lenses and the focus length keeper sleeve may be included in the scope of the Claims of the present invention.

The crime preventive door viewer of the present invention has a wide-angle vision of the outer field of about 160 degrees by a three lens assembly, so the present door viewer is fully effective for prevention against crime in addition to requiring very few necessary elements or members of the assembly and manufacturing thereof is easy. Also the assembly procedure is simple and easily, and the present door viewer may be provided at an economically low cost, since the same shaped concave lens is able to be reversely used in common as either the first or second objective. Therefore, many prominent and excellent features of the present invention shall become manifest from the above description.

What is claimed is:

1. A wide-angle lens assembly particularly suitable for use as a door viewer having an image side and an object side comprising:
   an eyepiece mounted proximate said image side of said lens assembly;
   a first and a second objective lens juxtaposed adjacent said image side of said lens assembly; and
   focal length means intermediate said eyepiece and said first and second lenses to maintain a desired distance therebetween;
   said first and said second objective lenses being identically formed each with concave surfaces on the opposite sides thereof, the concave surface on one side of each lens having a larger radius of curvature and the concave surface on the other side of each of said lenses having a smaller radius of curvature, said lenses being juxtaposed with said sides having the concave surfaces with the smaller radii of curvature facing toward each other and with the sides having the concave surfaces with the larger radii of curvature facing away from each other.

2. A lens assembly according to claim 1 wherein said focal length means comprise a tubular member having said eyepiece arranged at one end thereof and said first and second objective lenses juxtaposed at the opposite end thereof, said tubular member being of a length to maintain said eyepiece and said lenses spaced apart in focused position.

3. A lens assembly according to claim 1 wherein said tubular member is made of synthetic resin material and has a nonreflective inner surface.

4. A wide-angle lens assembly particularly suitable for use as a door viewer having an image side and an object side comprising:
   an eyepiece mounted proximate said image side of said lens assembly;
   a first and a second objective lens juxtaposed adjacent said image side of said lens assembly;

focal length means intermediate said eyepiece and said first and second lenses to maintain a desired distance therebetween;

said first and said second objective lenses being identically formed each with concave surfaces on the opposite sides thereof, the concave surface on one side of each lens having a larger radius of curvature and the concave surface on the other side of each of said lenses having a smaller radius of curvature, said lenses being juxtaposed with said sides having the concave surfaces with the smaller radii of curvature facing toward each other and with the sides having the concave surfaces with the larger radii of curvature facing away from each other; and lens support means including an inner tube and an outer tube threadedly fitted together, with said eyepiece, said focal length means and said first and second objective lenses being operatively mounted within said lens suport means, said inner tube having an inner flange adapted to receive in abutting engagement said eyepiece and said outer tube having an outer flange adapted to be engaged by threaded stopper means engaging one of said first and second objective lenses to hold said lenses, said focal length means and said eyepiece in mounted engagement within said lens support means.

5. A lens assembly according to claim 1 or 4 further comprising a colored filter located between one of said first and second objective lenses and said focal length means.

6. A lens assembly according to claim 5 wherein said colored filter is yellow.

7. A lens assembly according to claim 5 wherein said colored filter is light blue.

* * * * *